(No Model.)
G. F. PERKINS & J. P. HURLEY.
ELECTRIC GAS LIGHTING SYSTEM.
No. 367,841. Patented Aug. 9, 1887.
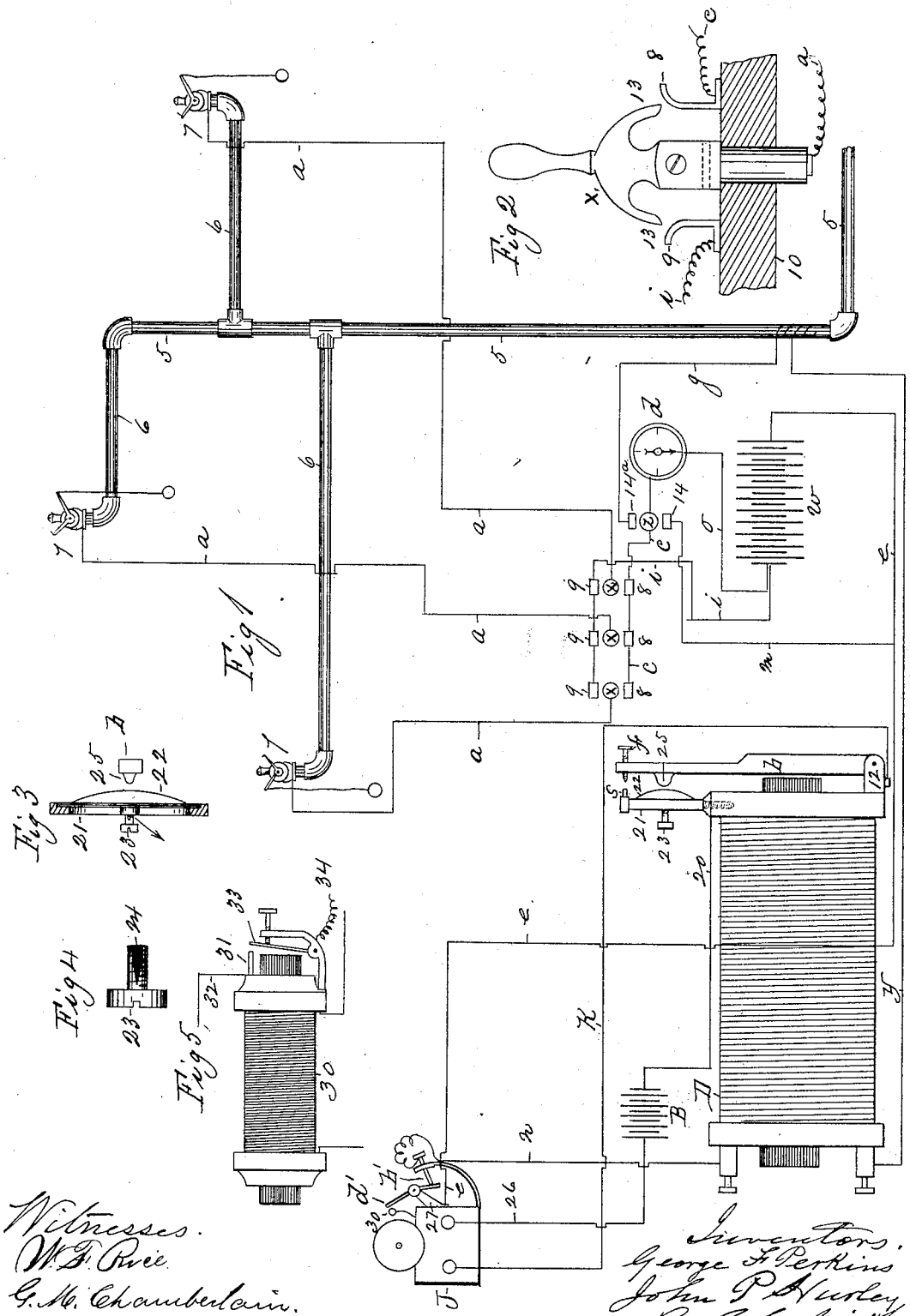
Witnesses.
W. F. Rice.
G. M. Chamberlain.
Inventors.
George F. Perkins
John P. Hurley
By Chapin &c
Attys

UNITED STATES PATENT OFFICE.

GEORGE F. PERKINS AND JOHN P. HURLEY, OF HOLYOKE, MASSACHUSETTS.

ELECTRIC GAS-LIGHTING SYSTEM.

SPECIFICATION forming part of Letters Patent No. 367,841, dated August 9, 1887.

Application filed April 22, 1887. Serial No. 235,732. (No model.)

*To all whom it may concern:*

Be it known that we, GEORGE F. PERKINS and JOHN P. HURLEY, citizens of the United States, residing at Holyoke, in the county of Hampden and State of Massachusetts, have invented new and useful Improvements in Electric Gas-Lighting Systems, of which the following is a specification.

This invention relates to electric gas-lighting devices, and pertains, first, to improvements in means for locating the cause of any lack of proper conductivity in the various conducting-wires of electric gas-lighting systems and to means for ascertaining the degree of electric energy which is expended on conducting-wires leading to the several burners or chandeliers; secondly, to improved means for connecting and operating an alarm-bell in said systems; thirdly, to improvements in spark-coils therefor; and, fourthly, to improved means for throwing the main battery and spark-coil automatically out of circuit when the alarm-bell is rung; and the invention consists in the construction, arrangement, and combinations of certain parts of the device, all as hereinafter fully described and pointed out in the claims.

In the drawings forming part of this specification, Figure 1 is a plan view showing a gas-pipe and several branches provided with gas-burners, of the type of those which are adapted to be lighted by electricity, and batteries, switches, a spark-coil, and an alarm-bell constructed and arranged according to our invention. Fig. 2 is a detail view in side elevation of a switch and its connections, hereinafter fully described. Figs. 3 and 4 illustrate details of the construction of certain parts connected with the spark-coil, which are hereinafter fully described. Fig. 5 illustrates a modified construction of the spark-coil.

In the drawings, 5 indicates a gas-pipe for conducting gas into a house or other place to be lighted, having several branches, 6, running therefrom, to each of which is attached an electric gas-lighting burner, 7, of ordinary construction, and to each of said burners is connected, in the usual manner, an electric conductor, $a$. Said electric conductors $a$ connect with three switches, $x$, one of which switches, and contact-springs each side thereof, is shown in Fig. 2, inserted in a piece, 10. (Shown in section in said figure, which represents a portion of a switch board or table to which said switches are attached in practice.)

At the sides of the switches $x$ are arranged three contact-springs, 9, which are attached to said table 10, said springs 9 being connected with the conducting-wire $i$, which leads to one pole of the main battery $w$. The springs 8 on the opposite sides of the switches $x$ are likewise attached to the table 10, and are connected with the conducting-wire $c$, which leads through a fourth switch, $z$, to a galvanometer, $d$, the latter being connected with said main battery by the conducting-wire $o$.

The spark-coil D is connected by the wire $n$ with the adjustable contact-screw $b'$ and by the wire $y$ with the gas-pipe 5, and thereby completing a circuit with the battery $w$, through said screw $b'$, the vibratory lever $d'$, and the conductor $e$, as below described. Said spark-coil has attached to one end thereof an armature-support, 12, and an armature, $b$, is pivoted by its lower end to said support 12, as shown, and vibrates opposite the end of the spark-coil, carrying the contact-screw $f$ in its free end against the contact-point $s$, the latter being connected with a local battery, B, by the conductor 20. The armature $b$ is connected through its support 12 and the conductor K with the bell J. To obviate any contact, however, between said screw $f$ and the point $s$ when the armature $b$ is slightly affected by such temporary electric action as the lighting of a burner would occasion, a suitable frame, 21, is fixed at one end of the spark-coil D, on which is fixed tightly by its border a flexible diaphragm, 22, having normally a convex form, as shown. The chamber between said diaphragm and the adjoining side of the frame 21 is air-tight, save through a hole in said frame, in which a screw, 23, is placed, having a tapering groove, 24, therein. (See Figs. 3 and 4.) The armature $b$ has thereon a projection which strikes the diaphragm 22, when said armature is, by the attraction of the coil D, drawn toward the latter, thereby causing the diaphragm to be compressed as fast as the air within it can escape therefrom through said groove in the screw 23, and finally the screw $f$ and point $s$ come in contact, thereby completing a circuit in which is embraced the conductor 26, the alarm-bell J, and the conductor K, leading from said bell to the aforesaid armature-support 12, and causing said bell to ring. Said signal-bell is of ordinary construction. Screwing the screw 23 out or in varies the air-passage formed by the tapering slot 24, thereby regulating the action of the diaphragm 22.

On opposite sides of the switch $z$ are arranged contact-springs 14 and $14^a$, similar to the aforesaid springs 8 and 9, and to said springs 14 and $14^a$ are attached the wires $g$ and $m$, one of which connects one of said springs with the gas-pipe 5, and the other of which connects one of said springs with the conductor $e$, between the main battery $w$ and the arm 27 on the bell J, and through said arm, the lever $d'$, the screw $b'$, and the conductor $n$ to the spark-coil D.

The normal position of the switch $z$ is that shown in Fig. 2—that is to say, out of contact with both of the springs 14 and $14^a$. The normal position of the switches $x$ $x$ $x$ in the electric-lighting system is with one of the arms 13 thereof swung over in contact with the springs 9, thereby forming an electric circuit through the conductors $i$, $e$, $n$, and $y$ to the pipe 5, in which is embraced the main battery $w$, the arm 27, the vibratory lever $d'$, the screw $b'$, and the spark-coil D. By swinging either of the switches $x$ to an upright position, as shown in Fig. 2, whereby its arm 13 is disconnected from one of the springs 9, whichever of the burners 7 is connected to the spring thus thrown out of contact with the switch is thereby cut out of the said circuit in which the main battery $w$ is embraced.

To test the conductivity of the lines $a$, which are connected with the burners 7, and to ascertain the degree of electric energy exerted thereon by the main battery $w$, either one of the switches $x$ is so turned as to break contact with the line $i$, which leads directly to the battery, and to carry one of its arms 13 in contact with one of the springs 8, and then by working the contact-lever on the burner a circuit is formed through the switch in which is embraced the galvanometer $d$, and the latter is thereby made to indicate the said conductivity of the line leading to the burner and the degree of electro-motive force of the battery.

When none of the switches $x$ are in connection with the line $c$, which connects them with the galvanometer, and it becomes desirable to test the strength by the latter of the main battery $w$, the switch $z$ is brought into use and is swung to contact with the spring 14, which is connected with the conductor $m$, and thereby is formed a circuit embracing therein the main battery and the galvanometer, and the latter then indicates the strength of said battery.

The above-described construction and arrangement of the armature $b$ on the end of the spark-coil D, together with the above-described circuit embracing the local battery B and the alarm-bell J, provides means, free from complications of construction, for causing the said alarm-bell to be rung by the action of said local battery when anything occurs on either one of the lines $a$ to form inadvertently or through accident an electric connection between the burner and one of said lines, thereby giving notice that such is the case; and by working the switches $x$ $x$ $x$, one after another, until the alarm-bell stops ringing, one is enabled to determine on which of said lines there exists an imperfection in the electric connection.

When the lighting-lever of either of the burners 7 is pulled, the armature $b$ on the end of the spark-coil is given a slight vibratory motion, as aforesaid, but not enough to bring it into contact with the contact-pin 23 and cause the bell J to be rung; but when a connection of any permanence, as aforesaid, is accidentally made through one of lines $a$, said armature is caused by the electro-magnetic effect of the spark-coil thereon to swing against the contact-pin $s$ and cause the ringing of the alarm-bell, thereby giving notice of said defect. The said vibratory lever $d'$ is of metal, and is pivoted near its lower end in the end of the metallic arm 27, the latter being secured on the side of the bell-box, as shown, so that the upper longer arm of said lever may overbalance its lower shorter one when vibrated, as below described.

By operating the screw $b'$ the lever $d$ may be adjusted at such distance from the hammer of the bell that the hammer will not strike said lever except when vibrating at full stroke, and, if desired, the end of said lever may be adjusted so far from the hammer that the latter will not strike the lever at all, thus acting as a switch to leave the circuit through the spark-coil and main battery uninterrupted.

As aforesaid, the normal position of the lever $d'$ is that shown in Fig. 1, connecting a circuit in which the spark-coil D and the main battery $w$ are included; but when the alarm-bell J rings from causes above described the bell-hammer 30 swings against the longer arm of said lever $d'$, knocking it over, so that its lower arm parts from the end of the screw $b$, thereby breaking the above-named circuit and preventing the exhaustion of the main battery. Furthermore, said lever by its changed position becomes a visible tell-tale, indicating the electrical disturbance which led thereto.

By turning all of the switches $x$ out of contact with the springs 9 or 8, and then turning the switch $z$ to contact with the spring 14, a circuit is formed through the galvanometer $d$, the main battery $w$, the spark-coil D, and the gas-pipe 5, whereby the strength of the battery through said circuit is tested, said circuit embracing the conductors $c$ $g$ $o$ $e$ $n$ $y$ and arm 27, lever $d'$, and screw $b'$.

Fig. 5 illustrates a spark-coil, 30, embracing a portion of the alarm-bell-operating devices which are connected with the coil D, and the said coil 30 may be employed in place of coil D when it is preferred that the alarm-armature on the coil be permitted to swing at once to its contact-point instead of being caused to move against a yielding obstruction, as does the armature $b$ on the spark-coil D. Said spark-coil 30 is adapted to be connected in the gas-lighting system in the usual way of connecting spark-coils therein, and the contact-point 31 is connected with a signal-bell through a local battery, as B, by the conductor 32, and said bell is connected with the armature 33 by the conductor 34. Therefore the action of the main battery on the coil when a lighting-circuit is connected causes the armature 33 at once to come into contact with the point 31 and the alarm-bell to be rung.

What we claim as our invention is—

1. In combination, in an electric gas-lighting system, a spark-coil, substantially as described, a main battery connected with the gas-supply pipe through said coil, one or more switches, $x$, having connections with the conductors $a$, leading to the burners, and a galvanometer connected with said battery and capable of a switch-connection with said conductors $a$, substantially as set forth.

2. In combination with the alarm-bell J, a spark-coil, the main battery connected with the latter, electric connections between said battery and the gas-burners, the local battery B, and an armature on said coil actuated by the main battery to close the circuit embracing said local battery and alarm-bell, substantially as set forth.

3. In combination, the spark-coil D, having a frame, 21, thereon, the flexible diaphragm 22, secured on said frame, the slotted regulating-screw 23, passing through said frame and communicating with the interior of said diaphragm, the armature $b$, pivoted at the end of said coil and having a vibratory motion against said diaphragm, the alarm-bell J, the local battery B, and suitable electric connections forming a circuit embracing said armature and frame, the battery B, and alarm-bell, substantially as set forth.

4. In combination, the spark-coil D, the alarm-bell J, the lever $d'$, the contact screw $b'$, the main battery $w$, the local battery B, and suitable electric connections forming circuits embracing said coils, batteries, bell, lever, and screw, substantially as and for the purpose set forth.

5. The combination, with the spark-coil D, of the armature $b$, the frame 21, the flexible diaphragm 22, secured on said frame, and the slotted regulating-screw 23, passing through said frame and communicating with the interior of said diaphragm, substantially as set forth.

GEO. F. PERKINS.
J. P. HURLEY.

Witnesses:
 WM. H. CHAPIN,
 G. M. CHAMBERLIN.